US006977763B1

(12) United States Patent
Wang et al.

(10) Patent No.: US 6,977,763 B1
(45) Date of Patent: Dec. 20, 2005

(54) FREE-SPACE OPTICAL ISOLATOR WITH INTEGRATED QUARTER-WAVE PLATE

(75) Inventors: Steve Wang, San Jose, CA (US); Mingkun Shi, Pleasanton, CA (US); Frank H. Levinson, San Jose, CA (US); Tengda Du, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/701,674

(22) Filed: Nov. 5, 2003

Related U.S. Application Data

(60) Provisional application No. 60/424,228, filed on Nov. 5, 2002.

(51) Int. Cl.⁷ ............................. G02F 1/03; G02B 26/00
(52) U.S. Cl. ........................ 359/246; 359/245; 359/238
(58) Field of Search ................................ 359/246, 245, 359/238, 280, 281, 251, 484, 494, 497, 498, 359/501

(56) References Cited

U.S. PATENT DOCUMENTS

| | | | |
|---|---|---|---|
| 4,770,505 A | 9/1988 | Okazaki | ..................... 359/484 |
| 5,375,009 A | 12/1994 | Otani et al. | .................. 359/282 |
| 5,517,356 A | 5/1996 | Araujo et al. | ................ 359/490 |
| 5,790,299 A * | 8/1998 | Wilson et al. | ............... 359/281 |
| 6,175,668 B1 | 1/2001 | Borrelli et al. | ............... 385/11 |
| 6,339,492 B1 * | 1/2002 | Terahara et al. | ............. 359/283 |
| 6,388,730 B1 | 5/2002 | Lindquist | ..................... 349/200 |
| 6,535,655 B1 | 3/2003 | Hasui et al. | ................... 385/11 |
| 6,535,656 B1 | 3/2003 | Noge et al. | .................... 385/11 |
| 6,606,885 B2 | 8/2003 | Harris et al. | ............... 65/30.11 |
| 6,654,168 B1 | 11/2003 | Borrelli et al. | ............. 359/487 |

* cited by examiner

*Primary Examiner*—Timothy Thompson
(74) *Attorney, Agent, or Firm*—Workman Nydegger

(57) ABSTRACT

The present invention provides low cost methods and apparatuses for filtering out polarized light reflections in a free-space optical isolator. In one embodiment, a laser directs a non-polarized optical signal through a series of polarizers and rotators in order to isolate an optical signal having a specific polarization. The present invention also includes a quarter-wave plate placed in series with the rotators and polarizers, to help filter away reflections occurring while the signal passes through free space. The inclusion of the quarter-wave plate helps filter away a greater amount of near-end reflections from going back to the laser, even with the use of low cost polarizers. Accordingly, the present invention can polarize an optical signal more efficiently than with prior methods, and at a much lower cost.

21 Claims, 6 Drawing Sheets

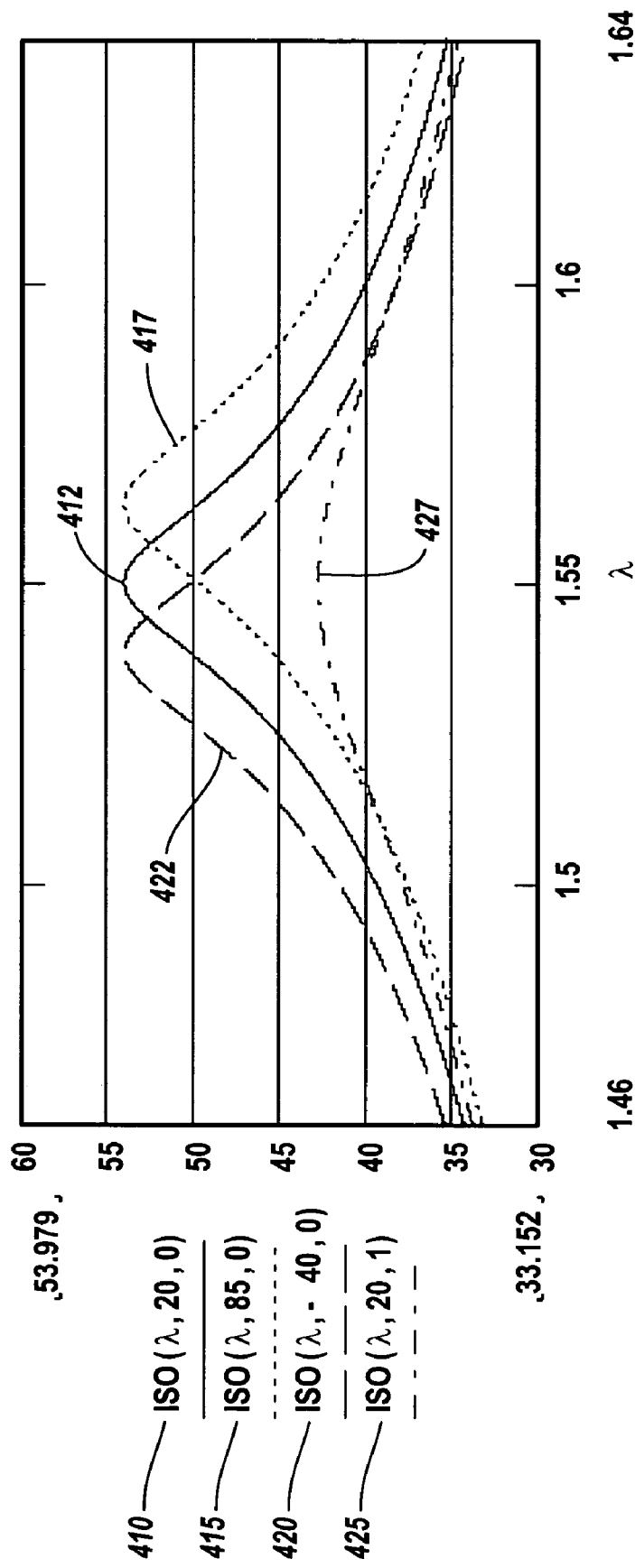

FREE-SPACE OPTICAL ISOLATOR WITH INTEGRATED QUARTER-WAVE PLATE

This application claims the benefit of priority to U.S. Provisional Application No. 60/424,228, filed on Nov. 5, 2002, the disclosure of which is incorporated herein by reference.

BACKGROUND OF THE INVENTION

1. The Field of the Invention

The invention generally relates to isolating a laser or light emitting diode in a fiber optic network from back reflections. More specifically, a more economical component arrangement is used to minimize the cost of an optical isolator.

2. Description of the Related Art

In the field of data transmission, one method of efficiently transporting data is through the use of fiber optics. Digital data is propagated through a fiber optic cable using light emitting diodes or lasers. Light signals allow for extremely high transmission rates and very high bandwidth capabilities. Also, light signals are resistant to electro-magnetic interferences that would otherwise interfere with electrical signals. Light signals are more secure because they do not allow portions of the signal to escape from the fiber optic cable as can occur with electrical signals in wire-based systems. Light also can be conducted over greater distances without the signal loss typically associated with electrical signals on copper wire.

One goal in modern fiber-optic communication configurations is to maintain the integrity of the signal generated by the laser or the light emitting diode. One common problem that degrades the integrity of the signal generated occurs when portions of the signal are reflected back into the laser. The reflections reaching the laser are generally an aggregation of the reflections caused by the individual connections within a fiber-optic network. While general care is taken to ensure that individual connections minimize reflection back to the laser, the aggregation of such reflections may result in unacceptably high reflections into the laser. Further, carelessness in the installation of a small number of connectors may also result in unacceptably high reflections being reflected back into the laser. Such reflections can cause increased transmission noise or bit error rates due to the reflections bouncing around the optical fibers, increased laser noise due to the reflections causing optical resonance in the laser and other similar problems.

One common cause of reflections occurs when a laser beam leaves a medium having a first index of refraction and enters a medium with a second index of refraction. An example of this situation is when a Distributed Feedback (DFB) laser is interfaced with a fiber-optic pigtail with free space between the transmitting end of a network component and the receiving end of the fiber-optic pigtail. Reflections of the laser beam that are reflected into the laser are commonly referred to as "back reflections." Back reflections are commonly measured in terms of a ratio of the amount of the laser beam that is reflected as compared to the transmitted part of the laser beam. This value is commonly expressed as a logarithmic ratio.

In terms of this logarithmic ratio, DFB lasers commonly require back reflection levels as low as −40 dB to operate properly. One specific type of reflection that needs attention is near-end back reflection. A near-end back reflection is one caused by the first couple of connections from a laser transceiver to a fiber optic pigtail and to a communications panel. Because these first connections generally occur in fiber-optic cable that is not subjected to bending and heat stresses, the state of polarization of the laser beam can be predicted fairly accurately.

One prior art method of controlling near-end back reflections is shown in FIG. 1, which generally shows a Transmitter Optical Subassembly (TOSA) designated generally as 100. The TOSA 100 comprises a DFB laser 102 coupled to an optical isolator 104. The optical isolator 104 includes a 0° polarizer 106 coupled to a Faraday rotator 108 coupled to a 45° polarizer 110. In operation, the DFB laser 102 emits a beam 114 which may be of any polarization as illustrated by the polarization indicator 112. The beam 114 passes through the 0° polarizer 106 which allows only the portions of the beam polarized at 0° to pass through causing the beam 114 to be polarized at 0° as shown by the polarization indicator 116. The beam 114 then passes through the Faraday rotator 108, which is designed to rotate the beam 114 by 45° in the positive direction.

The Faraday rotator 108 may be latching magnetic material or non-latching magnetic material. For non-latching material, an external magnet 109 may be used to apply a magnetic filed while latching material does not need an external magnetic field. This rotation causes the beam 114 to be polarized at 45° as is shown by the polarization indicator 118. The beam 114 then passes through the 45° polarizer 110 without disruption as the optical axis of the 45° polarizer 110 and the polarization of the beam 114 are aligned. The beam 114 remains polarized at 45° as is shown by the polarization indicator 120. The beam 114 is then propagated through an air space 122 into a fiber-optic pigtail 124.

Although shown here as a single discrete component, the fiber-optic pigtail 124 actually represents the various connections that are made throughout a fiber-optic network that include multiple fiber-optic pigtail, communication panel, transceiver, and other connections. Due to the difference in the index of refraction of the fiber-optic pigtail 124 (about 1.47) and the air space 122 (about 1.0) at various connections within the network, a reflected beam, denoted at 126, is propagated back towards the DFB laser 102. Because the reflected beam 126 is caused by various components within the network, the reflected beam 126 may be any state of polarization as shown by the polarization indicator 128.

A major part, however, of the reflected beam 126 is the near-end reflection caused by the first few components into which the beam 114 is transmitted. If these components are not subjected to mechanical and thermal stress, these portions of the reflected beam will be polarized at 45°. The reflected beam 126 passes through the 45° polarizer 110 such that only the portions of the reflected beam 126 that are polarized at 45° are allowed to pass through. This causes the reflected beam 126 to be polarized at 45° as shown by the polarization indicator 130. The reflected beam 126 then passes through the Faraday rotator 108 where it is rotated by positive 45° such that it is polarized to 90° as shown by the polarization indicator 132. Note that the Faraday rotator 108 rotates all beams passing through the Faraday rotator 108 by positive 45° irrespective of the direction of travel. The reflected beam 126 polarized at 90° has no 0° components and is therefore totally rejected from passing through the 0° polarizer 106. In this way back reflections into the DFB laser 102 are minimized.

While in theory this method appears to completely block any back reflections into the DFB laser 102, in practice this may not be the result. An ideal polarizer only allows beams to pass through at the angle of polarization. However, actual polarizers allow small portions of the beam perpendicular to the angle of polarization to leak through. One characteristic that determines the quality and often the price of a polarizer is the polarizer's ability to minimize the leakage of perpendicular beams passing through the polarizer. This characteristic is known as the polarizer's extinction ratio.

Commonly, the polarizers used in a TOSA 100 of the type described above have a perpendicular beam extinction ratio of about −40 to −45 dB. While using such polarizers effectively meets the operating criteria for most DFB lasers, the use of such polarizers can be expensive. For example, the polarizers can represent as much as 70% of the isolator cost. It would therefore be beneficial to construct an optical isolator using polarizers that are less expensive. Understandably, such polarizers may not have as high of extinction ratios, and therefore an alternate configuration of the other components within the isolator would need to be implemented.

SUMMARY OF A REPRESENTATIVE EMBODIMENT OF THE INVENTION

Example embodiments of the present invention solve one or more of the foregoing problems in the prior art by introducing methods and apparatuses for filtering out polarized light reflections in a free-space optical isolator. In one example embodiment, a laser directs non-polarized light through a series of polarizers and rotators in order to isolate an optical signal having a specific polarization. To increase the efficiency of the isolation, the embodiment includes a quarter-wave plate placed in series with the rotators and polarizers to aid in preventing back reflections of light to the laser.

These back reflections occur when the polarized optical signal is transmitted over free space. The inclusion of the quarter-wave plate allows a much greater amount of reflected light to be filtered away and thereby prevented from reflecting back to the laser. In this way, free-space optical isolators can use less expensive polarizers than used previously, and can thus block a much greater amount of reflected light at a much lower cost.

These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which advantages and features of the invention are obtained, a description of the invention will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 4A–4C illustrate some physical characteristics of a quarter-wave plate as contemplated by the present invention.

DETAILED DESCRIPTION OF THE INVENTION

Figure 1:
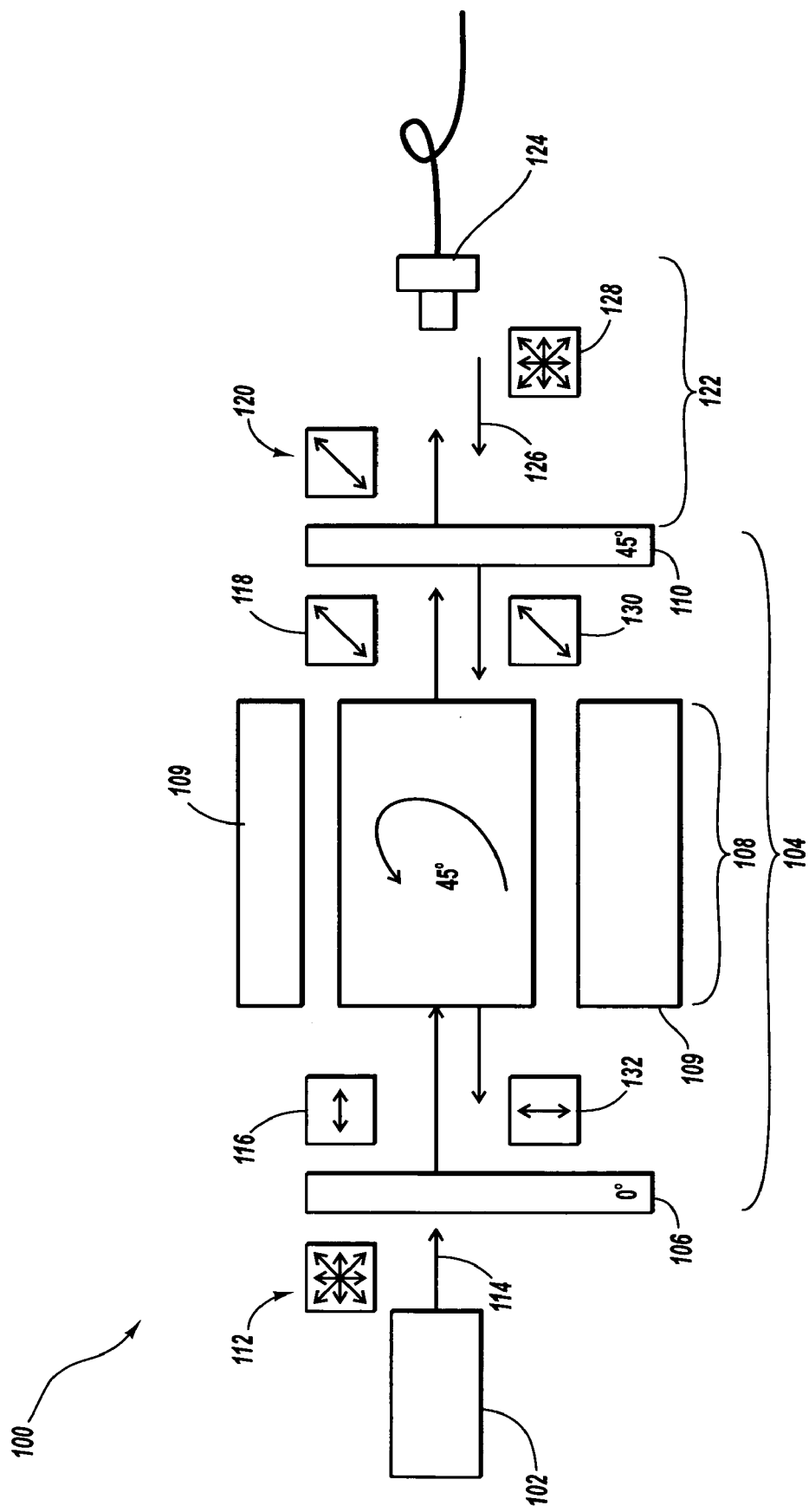
FIG. 1 illustrates a prior art example of an optical isolator used to minimize back reflections to a DFB laser source.
Figure 2:
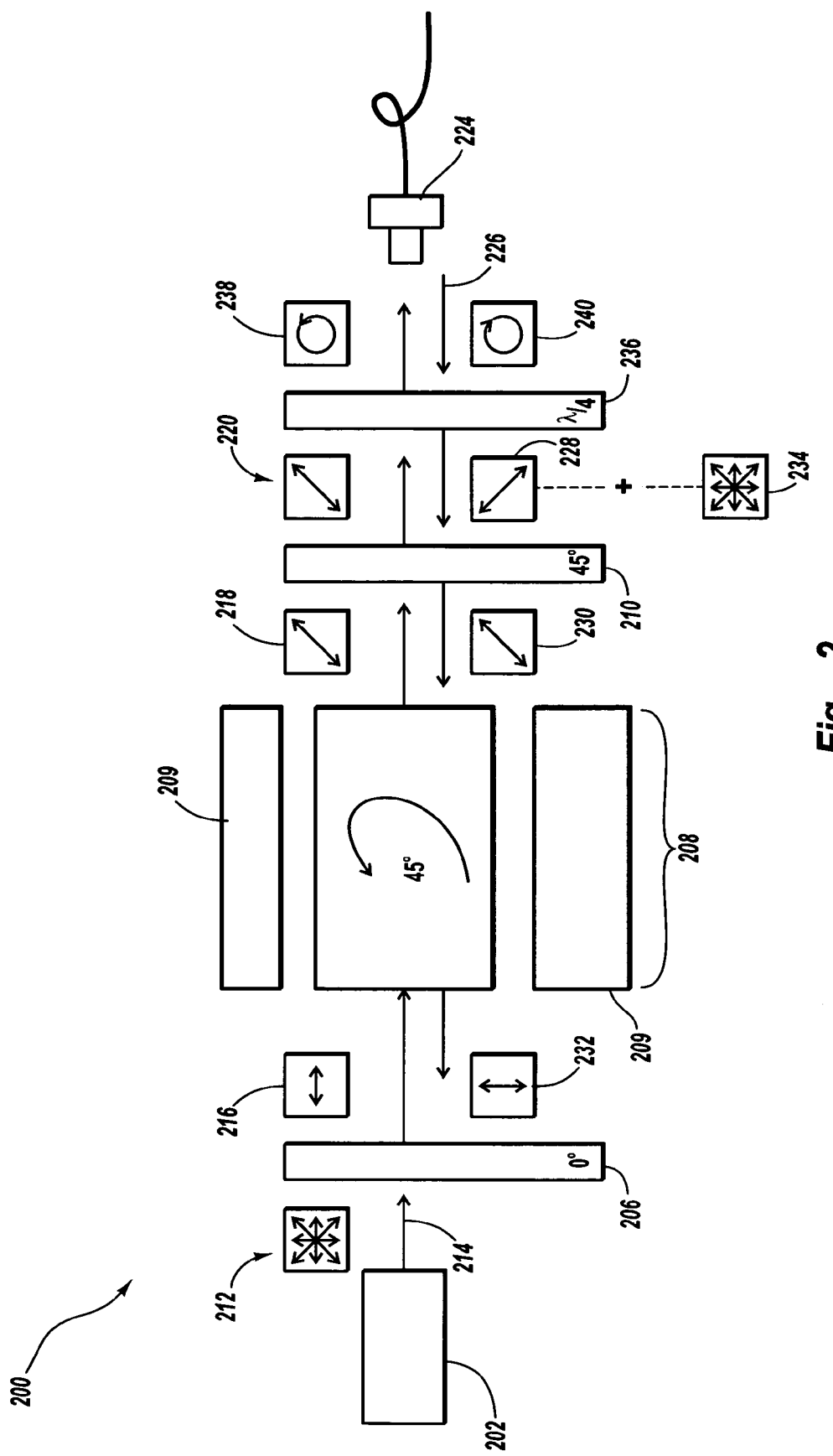
FIG. 2 illustrates an embodiment of the present invention that uses more economical components to accomplish the minimization of back reflections.

One device intended to optimize cost and still maintain an appropriate aggregate back reflection extinction ratio is shown in FIG. 2. In some respects, the device of FIG. 2 operates in a manner similar to the device of FIG. 1. For example, the DFB laser 202 emits a beam 214 that may be any state of polarization as shown by the polarization indicator 212. The beam passes through, for example, a 0° polarizer 206. As will be described, the 0° polarizer 206 need not be as efficient (and thus, as expensive) of a polarizer as described in FIG. 1, but may only require, for example, an extinction ratio of around −30 dB. The beam 214 travels through the 0° polarizer 206 and is polarized at 0° as shown by the polarization indicator 216. The beam 214 then travels through a Faraday rotator 208 similar to the type of Faraday rotator described in connection with FIG. 1.

As illustrated, the Faraday rotator 208 rotates the beam 214 to be polarized at 45°, shown by the polarization indicator 218. The beam 214 then passes through a 45° polarizer 210 unaffected, since the beam's 214 polarization and the 45° polarizer axis are aligned. Of note, the 45° polarizer 210 may be of the type with a higher extinction ratio such as −40 to −45 dB. The reasons for using such a polarizer will become more apparent as the return path for a reflected beam is shown. After leaving the 45° polarizer, the beam 214 then passes through a quarter-wave plate 236, illustrated in series with the 45° polarizer.

Figures 3A, 3B, 3C:
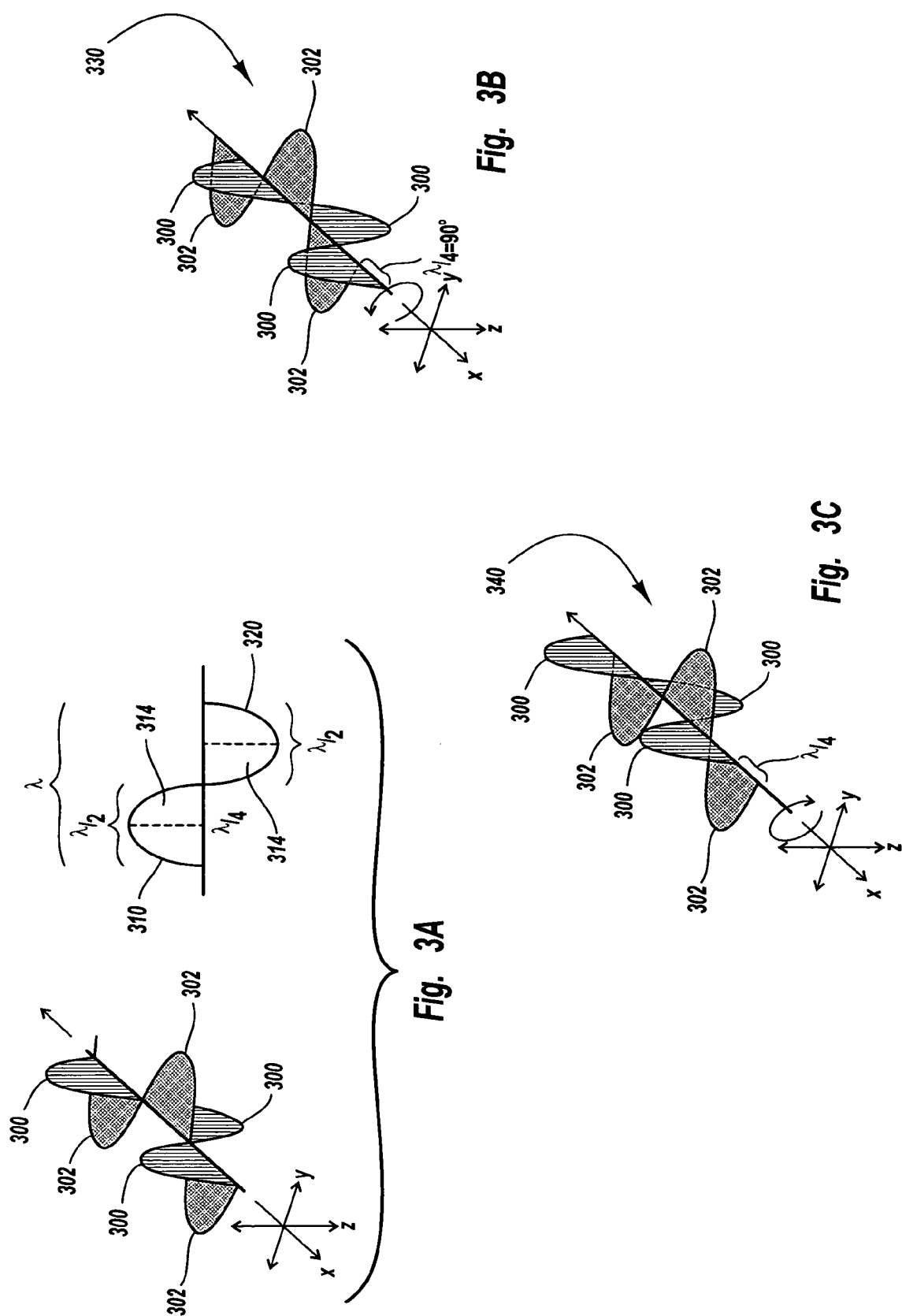
FIGS. 3A–3C illustrate the electromagnetic components of an optical signal as the optical signal passes through a quarter-wave plate.

By way of explanation, FIGS. 3A–3C illustrate the results of using a quarter-wave plate 236 when a standard light beam in a linear polarization passes through the quarter-wave plate 236. Linearly polarized light comprises two orthogonal components, including an electric field component 300, and a magnetic field component 302, both appearing as a series of up 310 and down 320 arcs about an axis (e.g., a sinusoidal wave about an X axis). Two arcs (one up λ/2 310 and one down λ/2 320) represent a full wave (or cycle) λ 322 about an axis for any orthogonal component, and the mid-point λ/4 314 of each arc constitutes a quarter-wave. A quarter-wave plate comprises a material that causes one of the orthogonal components in a light beam to shift relative to the other component, partly as a function of differences in speed for each component through the material. In a quarter-wave plate, the shift is one half of one arc, or a quarter of one wave λ/4 314. By contrast, in a half wave plate, the light beam travels through the material such that one component shifts back (or forward) a full arc, or one half wave λ/2 (310, 320).

When a linearly polarized beam passes through a quarter-wave plate at a 45° angle, the resulting light beam appears to approach the source as either circular to the left or circular to the right, depending on which component the quarter-wave plate shifted (i.e., the faster or slower component through the material). Consider, for example FIG. 3B, a light beam approaching a viewer, where the electrical field component can be viewed on a Z axis, and the magnetic field component can be viewed on an Y axis. A left-handed circularization 330 occurs when the magnetic component 302 shifts backward (i.e., travels more slowly through) a quarter-wave relative to the electrical component 300, so that, as the light approaches, the first thing a viewer sees is the electrical field component, then to the left by a quarter-wave, the magnetic field component, and so on circularly around the X axis. A right-handed circularization 340, (e.g., FIG. 3C) occurs under the exact opposite circumstance.

Figure 4B:
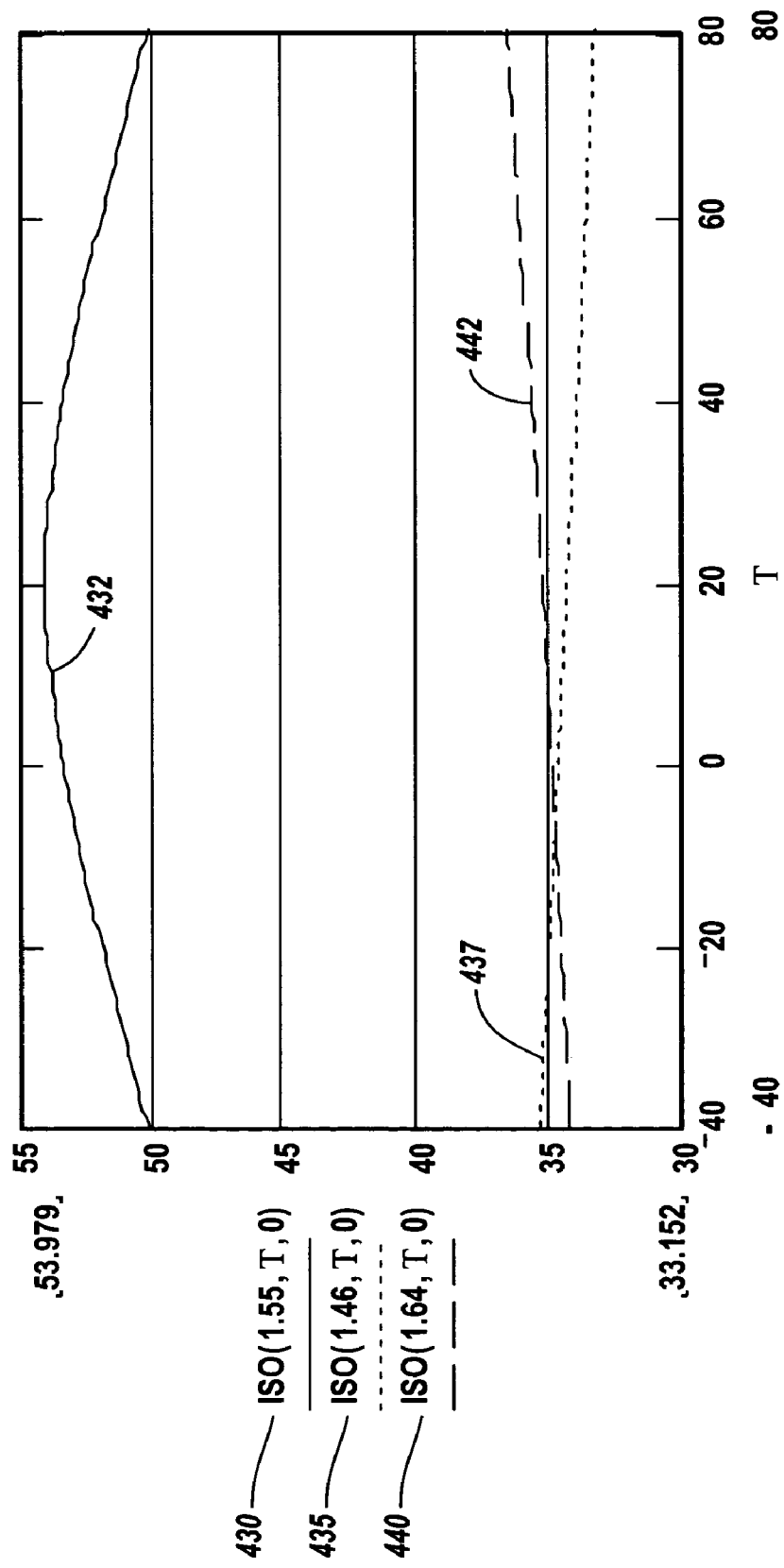
Figure 4C:
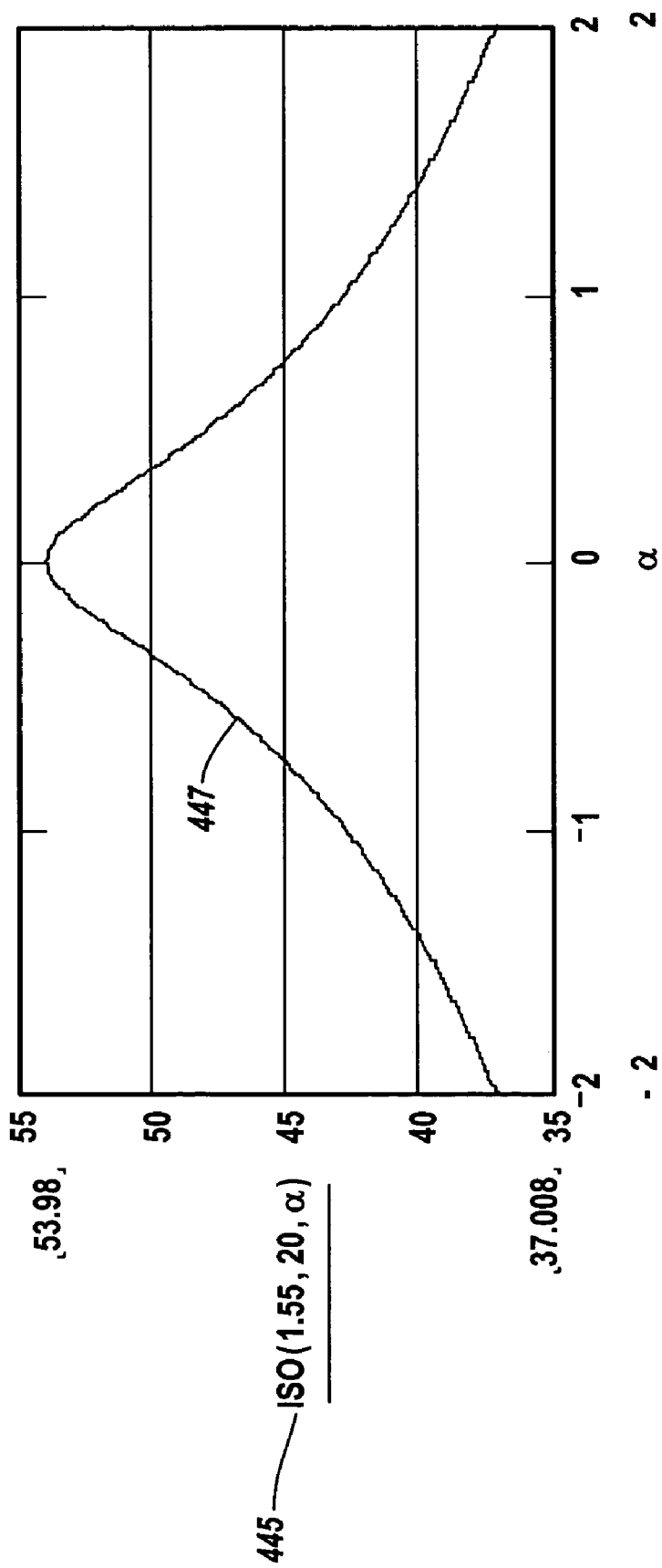

Quarter-wave plates can be particularly useful for optical signal isolation since they respond more to wavelength and degree of alignment than to temperature fluctuations. FIGS. 4A–4C illustrate this principal, where the Y axis represents an amount of light transmitted through the wave plate, and the X axis represents the wavelength of approaching light. The wave plate is shown centered about a wavelength of 1.55 nm, and the four different optical signals are plotted over three separate parameters. The three different parameters are: a wavelength λ parameter (in this case 1.55 nm), a temperature (20, 85, –40, and 20) parameter, and an angle alignment parameter as between the approaching optical signal and the wave plate (0, 0, 0, and 1). The parameters are plotted by the following formula, which expresses the temperature and wavelength dependence of phase retardation (shifting of an optical signal component) of a wave plate as:

$$\delta(\lambda, T) := \frac{\pi}{2} \cdot \left[1 + \frac{\lambda c - \lambda}{\lambda} + CTE \cdot (T - T0) + \frac{d\Delta n dT}{\Delta n} \cdot (T - T0) + \frac{d\Delta n d\lambda}{\Delta n} \cdot (\lambda - \lambda c)\right]$$

Accordingly, optical signal 410 is plotted by curve 412, optical signal 415 is plotted by curve 417, optical signal 420 is plotted by curve 422, and optical signal 425 is plotted by curve 427. As illustrated, a change in temperature for each different optical signal has little overall effect on the amount of transmitted light (shifting the signal left or right, essentially within the same transmission). By contrast, a misalignment of optical signal angle (signal 420) by one degree between the transmitted light and wave plate shows a significant drop in transmission of the optical signal through the wave plate.

FIG. 4B illustrates three optical signals 430, 435, and 440 transmitted through a wave plate, the wave plate also centered at a wavelength of 1.55 nm. Optical signal 430 is plotted by curve 432, optical signal 435 is plotted by curve 437, and optical signal 440 is plotted by curve 442. FIG. 4B illustrates that changes in optical signal wavelength also cause a significant difference in transmission through the wave plate, when holding temperature and alignment angle constant. In particular, curve 432 is at a much higher transmission level through the wave plate since it is aligned at 1.55 nm, in contrast with curves 437 and 442, which are of different wavelengths from the wave plate.

FIG. 4C further emphasizes this nature of the wave plate, showing a plot of optical signal transmission 445 (having a wavelength of 1.55 nm) through a wave plate centered at 1.55 nm. As illustrated in FIG. 4C, even 1 degree of misalignment between the optical signal and the wave plate causes a significant change in transmission of the optical signal through the wave plate. Accordingly, quarter-wave plates are particularly useful in a free-space optical isolator since they are essentially independent of temperature for purposes of transmission, and provide a useful filter of optical signals approaching the wave plate at a misaligned angle.

Returning to the embodiment illustrated in FIG. 2, the quarter-wave plate receives the portion of beam 214 aligned at 45°, and causes the beam 214 to have a left-handed circular polarization, as shown by the polarization indicator 238. Of course in other embodiments, the quarter-wave plate may be composed of materials that cause the oz beam 214 to take on a right-handed circular polarization. In either case, after the now-circularized beam 214 exits the quarter-wave plate 236, the beam 214 is then propagated into the fiber-optic pigtail 224 and onto the fiber-optic network.

Due to the phenomenon described above regarding light traveling in a medium having a first index of refraction into a medium having a second index of refraction, a reflection beam 226 is reflected back towards the DFB laser 202. For purposes of this illustration, the reflected beam 226 only represents a near-end reflection. Because the reflected beam 226 is generally caused by fiber-optic components that are not subjected to physical and heat stresses and because a circularly reflected beam is generally also circular and opposite in polarization to the original beam, the reflected beam 226 is a right-hand, circularly polarized beam as shown by the polarization indicator 240.

Returning to FIG. 2, when the reflected beam 226 passes through the quarter-wave plate, the quarter-wave plate 236 acts essentially as a half wave plate (relative to the initial beam 214) since the reflected beam 226 has already been shifted one quarter-wave. The quarter-wave plate 236, therefore, causes the reflected beam 226 to become linearly polarized due to the quarter shift, but this time at –45°, as shown by the polarization indicator 228. This polarization is perpendicular (or 90°) to the optical axis of the 45° polarizer 210. Hence, nearly all the reflected beam 226 is blocked by the 45° polarizer 210 because of this perpendicular relationship. A high-quality polarizer exhibiting an extinction ratio of around –40 to –45 dB can be used for the 45° polarizer 210 to maximize the extinction of the near-end back reflection.

Of course, inexpensive materials may still allow passage of a small amount of reflected beam 226 through the quarter-wave plate 236 at a variety of angular planes 234, including the 45° plane 230. Similarly, a small portion of beam 214 could pass through the quarter wave plate 236 on the first pass without becoming circularized, and become circularized only upon passing through the second time upon reflection as a portion of reflected beam 226. Typically, however, only that minute portion of the reflected beam 226 that is made linear in the 45° plane will pass through the second polarizer 210 back to the Faraday rotator 208. Thus, the second polarizer 210 also blocks circularized light from passing through upon reflection.

Consequently, the primary reflected signal that the Faraday rotator 208 receives will be any remaining linear portions of reflected beam 226 that are angled at 45°, and that passed through the second polarizer 210. The Faraday rotator 208 then rotates those remaining portions counter-clockwise so that the remaining portions of reflected beam 226 are then vertical 230. Since the vertical position 230 in this case is perpendicular to the polarization axis of the first polarizer 206, the first polarizer 206 filters away the remaining near-end reflected light 226 from reaching the DFB laser 202.

Accordingly, these representative embodiments demonstrate an economically efficient alternative for constructing an optical isolator with a high extinction ratio for use in a TOSA (or similar optical environment). The present invention may be embodied in other specific forms without departing from its spirit or essential characteristics. The described embodiments are to be considered in all respects only as illustrative and not restrictive.

We claim:

1. An optical isolator comprising:
   a first polarizer at 0° of polarization;
   a Faraday rotator placed in series with the first polarizer;
   a second polarizer at 45° of polarization, the second polarizer being in series with the first polarizer; and a quarter wave plate placed in series with the second polarizer and arranged such that both the first and second polarizers are positioned on one side of the quarter wave plate.

2. The optical isolator of claim 1, wherein the first polarizer has an extinction level of poorer grade than −40 dB.

3. The optical isolator of claim 1, wherein the second polarizer has an extinction level of poorer grade than −40 dB.

4. The optical isolator of claim 2, wherein the second polarizer has an extinction level of poorer grade than −40 dB.

5. The optical isolator of claim 1, wherein the second polarizer is placed in series with the Faraday rotator.

6. The optical isolator of claim 1, further comprising:
an amplified optical signal generator; and
a fiber-optic pigtail.

7. The optical isolator of claim 1, wherein the optical isolator is a component of a transmitter optical sub-assembly that is used in a transceiver in a fiber optic communications environment.

8. In a transmitter optical sub-assembly of an optical transceiver, an optical isolation device for isolating portions of an optical signal generated by a laser while efficiently blocking near-end reflections from coming back to the laser, the device comprising:
an optical signal generator component for generating an initial signal having one or more polarization axes;
an initial linear polarizer component having an initial polarization axis, wherein those portions of the initial signal having a polarization consistent with the initial polarization axis pass through the polarizer;
a signal rotator component, the rotator capable of rotating the initial signal by a predetermined angle;
a subsequent linear polarizer component having a subsequent polarization axis, wherein those portions of the initial signal received from the signal rotator having a polarization consistent with the subsequent axis pass through the subsequent polarizer; and
a quarter-wave plate component, wherein those portions of the initial signal passing through the quarter-wave plate are circularized, and whereby circularized portions of a reflected signal passing through the quarter-wave plate are made linear.

9. The optical isolator of claim 8, further comprising a fiber optic receptacle for receiving the optical signal after it has passed through the quarter-wave plate.

10. The optical isolator of claim 9, wherein each component is placed in series.

11. The optical isolator of claim 8, wherein the signal rotator is a Faraday rotator.

12. The optical isolator of claim 8, wherein the initial polarization axis is zero degrees, the subsequent polarization axis is 45 degrees, and the signal rotator rotates the signal by 45 degrees.

13. The optical isolator of claim 8, wherein the quarter-wave plate circularizes the initial signal in the left hand conformation, and wherein the quarter-wave plate shifts the reflected signal into a linear signal that is polarized perpendicular to the polarization of the initial signal.

14. The optical isolator of claim 8, wherein the initial and subsequent linear polarizers have an extinction ratio of a lesser grade than −40 dB.

15. The optical isolator of claim 8, wherein either or both of the initial and subsequent linear polarizers have an extinction ratio of a lesser grade than −35 dB.

16. A method for manufacturing a free-space optical isolator for isolating portions of an optical signal, wherein the optical isolator achieves a relatively high overall extinction ratio using relatively inexpensive polarizers, the method comprising:
placing an initial polarizer in a free-space optical isolator, the initial polarizer to be in series with an amplified-signal generation means, the initial polarizer having an initial degree of polarization;
placing a Faraday rotator on the free-space optical isolator in series with the initial polarizer;
placing a subsequent polarizer in series with the Faraday rotator, the subsequent polarizer having a subsequent degree of polarization; and
placing a wave plate in series with the subsequent polarizer, the wave plate capable of circularizing an optical signal.

17. The method of claim 16, wherein the initial polarizer has an initial degree of polarization of 0°.

18. The method of claim 16, wherein the Faraday rotator rotates an optical signal leaving the initial polarizer such that the optical signal is polarized at 45°.

19. The method of claim 18, wherein the subsequent polarizer has a subsequent degree of polarization of 45°.

20. The method of claim 19, wherein the wave plate is a quarter-wave plate.

21. The method of claim 16, further comprising:
placing an amplified signal generator in series with the initial polarizer, the signal generator placed to send a signal through the initial polarizer; and
placing a fiber optic pigtail in series with the quarter-wave plate, the fiber optic pigtail for receiving a circularized signal from the quarter-wave plate after the circularized signal has passed through free space.

* * * * *